Dec. 16, 1924.
R. C. G. STAATS-OELS
1,519,597
AUTOMOBILE BUMPER
Filed March 24, 1923   2 Sheets-Sheet 1
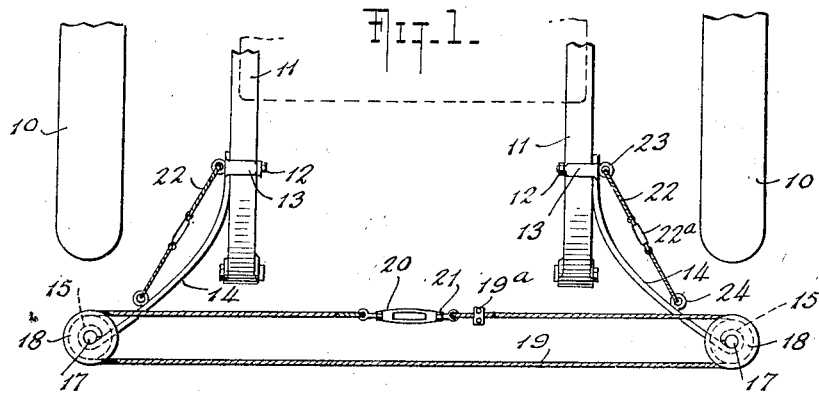
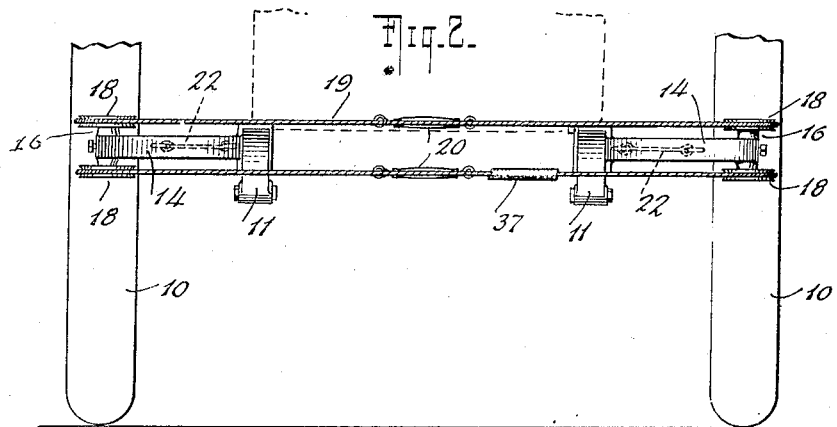
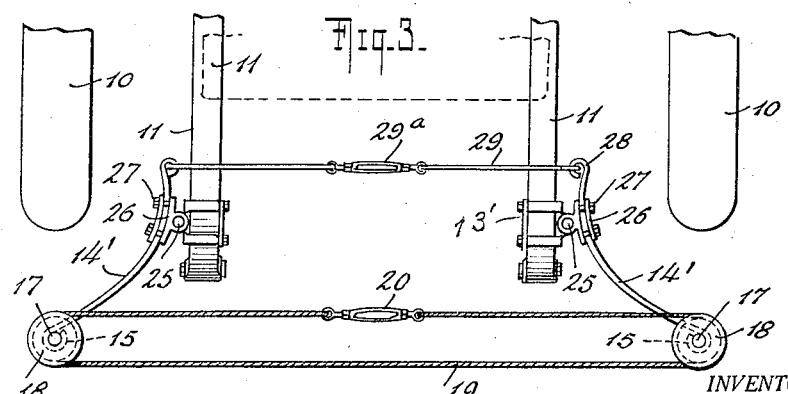
INVENTOR.
RUDOLPH C. G. STAATS-OELS
BY *Richards & Geier*
ATTORNEYS Dec. 16, 1924.
R. C. G. STAATS-OELS
1,519,597
AUTOMOBILE BUMPER
Filed March 24, 1923    2 Sheets-Sheet 2
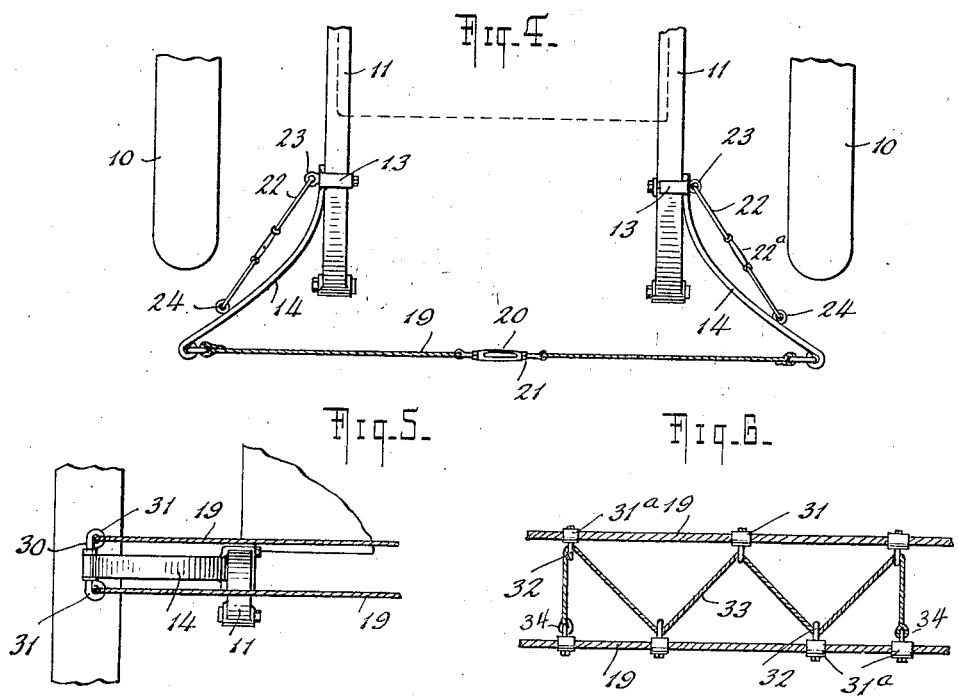
INVENTOR.
RUDOLPH C. G. STAATS-OELS
BY
ATTORNEYS Patented Dec. 16, 1924.

1,519,597

UNITED STATES PATENT OFFICE.

RUDOLPH C. G. STAATS-OELS, OF MONROE, NEW YORK.

AUTOMOBILE BUMPER.

Application filed March 24, 1923. Serial No. 627,246.

*To all whom it may concern:*

Be it known that I, RUDOLPH C. G. STAATS-OELS, a citizen of the United States, residing at Monroe, county of Orange, and State of New York, have invented certain new and useful Improvements in Automobile Bumpers, of which the following is a specification.

This invention relates to automobile bumpers, the usual and common constructions of which consist of one or more sections of spring metal usually from two to three inches in width and about one half of an inch in thickness, which sections extend across the full width of the machine. These spring bumpers are generally connected to the front or rear ends of the chassis of the automobile by brackets, and the main outer portions of the spring sections which represent a considerable weight are located at distances varying from one to two feet from the point of attachment or support of the bracket to the frame, consequently the center of gravity of the spring exerts a considerable moment upon the brackets or point of support of the bumper, thereby causing undue vibrations, which cause loosening and breaking of the brackets, and frequently of the spring sections.

Again, when these spring bumpers are subjected to a heavy impact such as occurs when the car collides the spring metal sections as well as the brackets are frequently broken and as the cost of the spring sections represents the major part of the cost of the bumper the replacement charges are not only almost as high as the original purchase price of the bumper, but the work of replacing the sections is laborious and furthermore usually requires the services of a skilled mechanic.

The principal object of this invention therefore is to provide a new and improved construction which will obviate the defects enumerated and to provide a structure which while very much more inexpensive to manufacture than the usual spring constructions will present a neater appearance.

Another object is to provide a construction which while lighter in weight than the spring constructions and thereby overcoming excessive vibrations, will possess the same desired resiliency and have also as great, if not greater, strength.

A further object is to provide a construction in which the members which directly receive the impact may be easily and cheaply replaced and which members if desired may be removed and used as a tow line for the automobile.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:—

Fig. 1 is a plan view of the front portion of an automobile having attached thereto a bumper embodying my invention.

Fig. 2 is a front elevation of the structure shown in Fig. 1.

Fig. 3 is a view similar to Fig. 1 showing a modified form of the bumper supporting means.

Fig. 4 is a similar view of a further modification.

Fig. 5 is a partial front elevation of the structure shown in Fig. 4.

Fig. 6 shows in elevation an interconnecting means for the impact receiving members.

As shown in Figs. 1 and 2 of the drawings, the numeral 10 indicates the front or rear wheels of an automobile and the numeral 11, the side frames of the chassis. Suitably secured to the frames 11 as by the bolts 12 are brackets 13, to which are secured the inner ends of flat springs 14 having their outer ends as indicated at 15, curled about in a groove provided in a sleeve 16 as shown in Fig. 2. Fixed within the sleeve 16 is a short shaft 17 having fixed to its upper and lower ends the grooved discs 18. It will be noted that the discs 18 are arranged in cooperating upper and lower pairs, the members of each pair being located one on each side of the machine in horizontal alignment. A length of wire cable 19 is trained about each cooperating pair of discs and is seated within the grooves thereof, the ends of the cable being secured together as by the turn buckle 20 along the inner run thereof. Lock nuts 21 are preferably provided to lock the turnbuckle after the cable has been drawn taut under tension and a cable clamp 19ª is preferably used to connect one end of the cable 19 to the turnbuckle. A bracing cable 22 is preferably provided and has its ends secured as at 23 and 24 to the brackets 13 and the spring 14 respectively.

In Fig. 3 is shown a modified form of the means for supporting the flat springs comprising the brackets 13′ to which are pivotally connected as at 25 the clamps 26 secured as by bolts 27 to the flat springs 14′. The manner of mounting the cables 19 in this form of the invention is similar to that shown in Figs. 1 and 2, but the ends of the springs 14′ are extended rearwardly of the clamps 26 and are formed into the eyes 28 in which are engaged the ends of a cable 29, in which a turnbuckle 29ª may also be interposed.

In the modification shown in Figs. 4 and 5 there is substituted for the grooved discs 18, a link 30 formed of a length of round bar bent to form the eye 31 through which the cable 19 is passed.

Fig. 6 shows a means for interconnecting the cables 19 so as to fill up the space between the cables and to insure that the force of an impact will be taken up and distributed equally to both cables. This means comprises the collars 31ª located at spaced intervals along the cables 19, the collars on the upper cable being in staggered relation to those on the lower cable. The collars are provided with the projecting eyes 32 through which the cable 33 preferably of smaller diameter than the cables 19, is twined to interconnect the cables, the ends of the cable 33 being suitably secured as by the eyes 34 to the end collars.

The manner of assembling and the operation of the device will be readily understood. The brackets 13 with the flat springs 14 secured thereto are attached to the framework after which the cables 19 are placed in position, the turnbuckles in the cables 19 and 22 being tightened to place the cables 19 under tension in a taut condition. The provision of the adjusting cables 22 with their turnbuckles 22ª permits a relatively large adjustment of the distance between the supports of cable 19 to be attained by a slight degree of adjustment of the cable 22.

The cables 19 which are preferably about $\frac{5}{16}$ to $\frac{3}{8}$ of an inch in thickness are capable of withstanding a very great strain, and will possess as great a degree of resiliency when in a taut condition as most of the spring bumpers now in use. Furthermore they are so much lighter in weight than the spring bumper that the vibrations will be reduced to a minimum. Again, should a cable be broken it may be replaced very easily and the cost of such replacement would be very slight. A further advantage is that the cables may be almost instantly removed and used for tow lines.

If desired the cables may be connected and covered by a rubber sheathing as indicated by the numeral 37 in Fig. 2.

While I have shown two runs of cable in the drawings, it will be obvious that any number of runs may be used and that instead of two separate cables a single cable could be threaded back and forth between the cable supports.

Having thus described my invention, what I claim as new and desire to secure by Letters Patent, is:

1. An automobile bumper comprising cable supports, a cable extending between said supports in a taut condition, and means to pivotally connect said cable supports to the side frames of an automobile chassis.

2. An automobile bumper comprising cable supports, a cable extending between said supports in a taut condition, means to pivotally connect said cable supports to the side frames of an automobile chassis, and adjusting means to swing said pivotally mounted means to vary the distance between said cable supports and thereby vary the tension in said cable.

3. An automobile bumper comprising cable supports, a cable extending between said supports in a taut condition, means to pivotally connect said cable supports to the side frames of an automobile chassis, comprising yielding means interposed between said cable supports and side frames.

4. An automobile bumper comprising brackets adapted to be secured to the side frames of an automobile chassis, flat springs connected adjacent their inner ends to said brackets, cable supports carried by said springs adjacent their outer ends, and a cable extended between said cable supports in a taut condition.

5. An automobile bumper comprising brackets adapted to be secured to the side frames of an automobile chassis, flat springs connected adjacent their inner ends to said brackets, cable supports carried by said springs adjacent their outer ends, a cable extended between said cable supports in a taut condition, and adjusting means to vary the tension in said cable.

6. An automobile bumper comprising brackets adapted to be secured to the side frames of an automobile chassis, flat springs connected adjacent their inner ends to said brackets, cable supports carried by said springs adjacent their outer ends, a cable extended between said cable supports in a taut condition, adjusting means to vary the tension in said cable comprising means interposed in said cable and means to vary the distance between said cable supports.

7. An automobile bumper comprising a plurality of runs of wire cable extended in a taut condition across the automobile, and means to interconnect said runs to cause an impact delivered to one of said runs to be transmitted to the other runs.

8. An automobile bumper comprising a plurality of endless runs of wire cables extending in a taut condition across the automobile, mountings supporting said cables, independently operable means for adjusting the tension of said runs of cables, and means for adjusting said mountings relative to each other.

In testimony whereof I have affixed my signature.

RUDOLPH C. G. STAATS-OELS.